F. J. HOFMEISTER AND J. O. MIDDAUGH.
GEAR SHIFTING MEANS FOR AUTOMOBILE TRANSMISSIONS.
APPLICATION FILED JULY 23, 1920.
1,392,830. Patented Oct. 4, 1921.
2 SHEETS—SHEET 1.
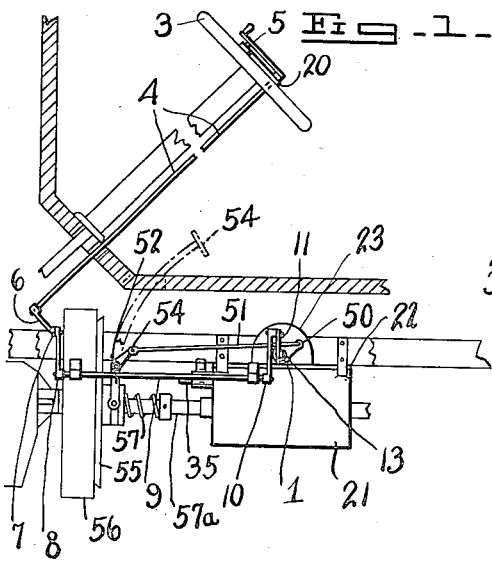
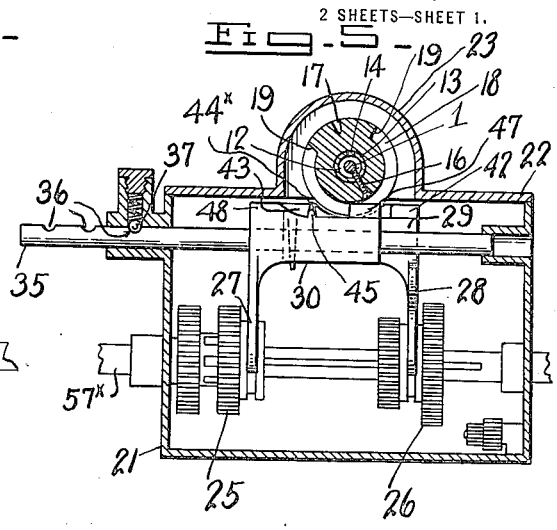
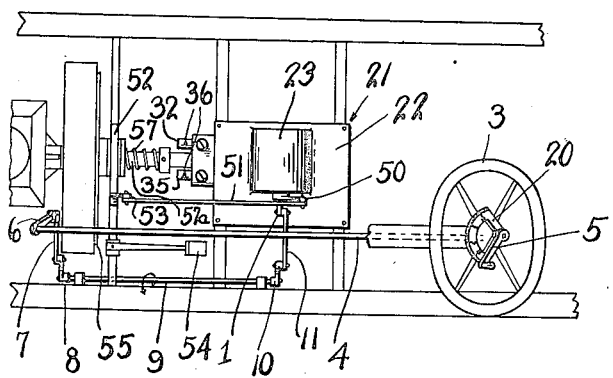
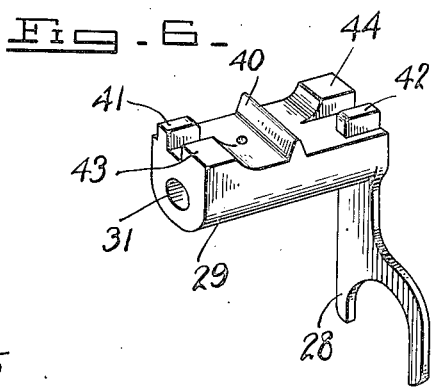
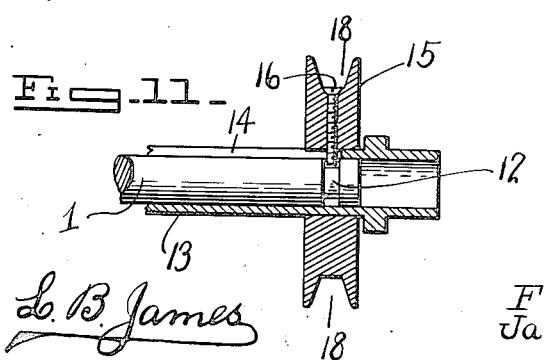
Frank J. Hofmeister &
James O. Middaugh,
INVENTORS
BY *Victor J. Evans*
ATTORNEY

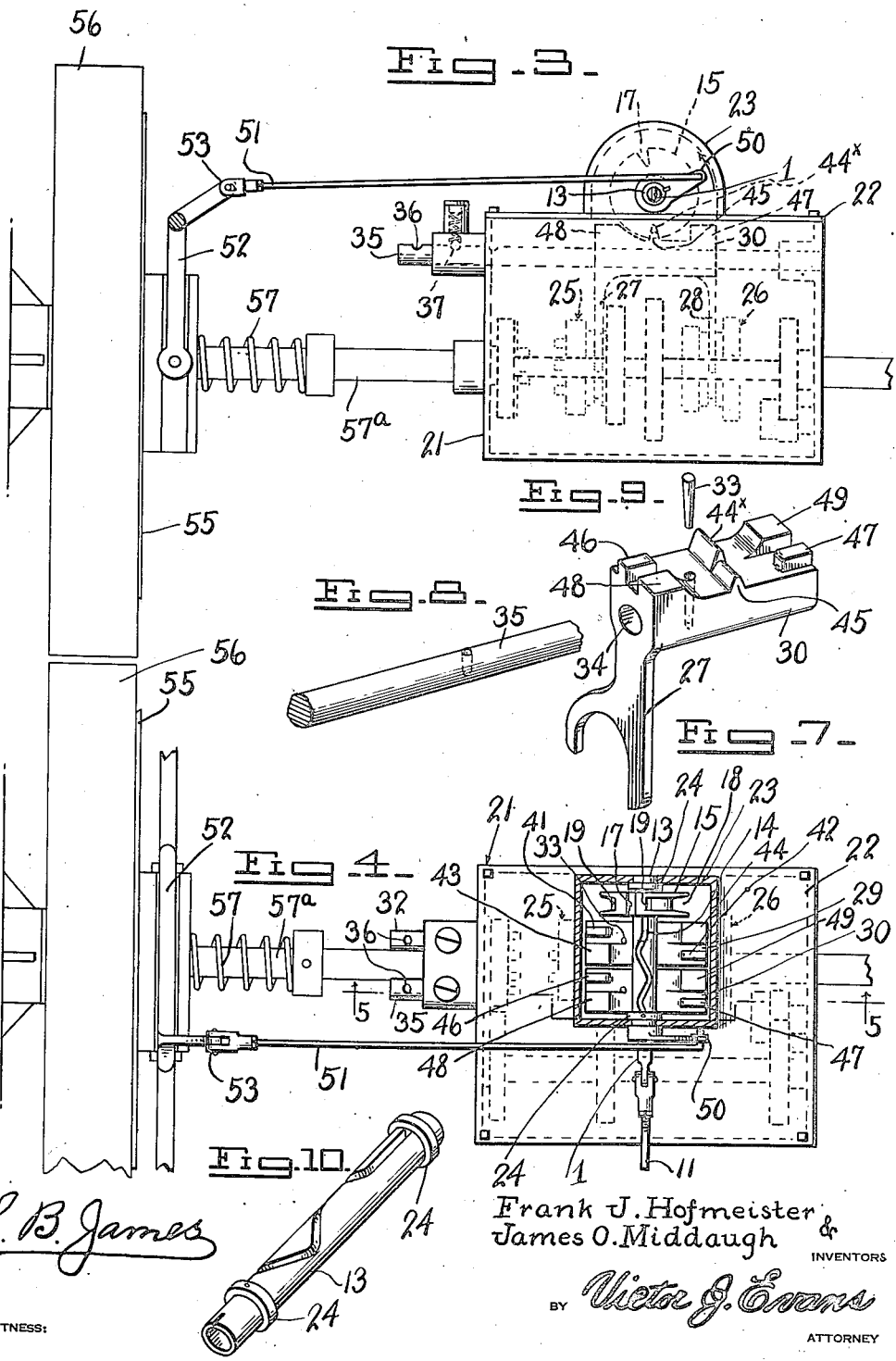

UNITED STATES PATENT OFFICE.

FRANK J. HOFMEISTER AND JAMES O. MIDDAUGH, OF YONKERS, NEW YORK.

GEAR-SHIFTING MEANS FOR AUTOMOBILE TRANSMISSIONS.

1,392,830.  Specification of Letters Patent.  Patented Oct. 4, 1921.

Application filed July 23, 1920. Serial No. 398,378.

*To all whom it may concern:*

Be it known that we, FRANK J. HOFMEISTER and JAMES O. MIDDAUGH, citizens of the United States, residing at Yonkers, in the county of Westchester and State of New York, have invented new and useful Improvements in Gear-Shifting Means for Automobile Transmissions, of which the following is a specification.

Our present invention has for its object the provision of gear shifting means of such characteristics that but little stress (manual or otherwise) is required for the quick selecting operations, and there is no liability of the transmission being accidentally changed.

To the attainment of the foregoing the invention consists in the improvement as hereinafter described and definitely claimed.

In the accompanying drawings, hereby made a part hereof:—

Figure 1 is a detail side elevation illustrating the arrangement of our improvement relatively to an automobile.

Fig. 2 is a projected plan view of the same.

Fig. 3 is an enlarged detail elevation.

Fig. 4 is a projected plan view of the same with some parts in section.

Fig. 5 is a longitudinal vertical section taken in the plane indicated by the line 5—5 of Fig. 4.

Fig. 6 is a detail perspective of one yoke and the head thereon.

Fig. 7 is a perspective of the other yoke and the head thereon.

Fig. 8 is a perspective of one of the guide rods to which the yoke heads are pinned or otherwise fixed.

Fig. 9 is a perspective of one of the pins for said purpose.

Fig. 10 is a perspective of the slotted tubular shaft.

Fig. 11 is a detail section showing the association of the slotted tubular shaft, the selector, and the interior shaft through the medium of which the selector is moved laterally.

Fig. 12 is a perspective of the said interior shaft.

Similar numerals of reference designate corresponding parts in all of the views of the drawings.

It is within the purview of our invention to use any appropriate means for moving endwise the shaft 1, Figs. 11 and 12, through the medium of which the selector 15 is shifted laterally. By way of example, however, we show in association with the steering wheel 3 of an automobile a rock shaft 4, Figs. 1 and 2, on which is a handle 5 and a crank 6, the latter being connected through the medium of a link 7 with a crank 8 on a second rock shaft 9 the rear crank 10 of which is connected through the medium of a link 11 with the outer end of the shaft 1. The shaft 1 is provided at 12 with a circumferential groove, and said shaft 1 is sheathed in a tubular shaft 13, mounted to be rocked about its axis as hereinafter described and provided with a serpentine slot 14. Surrounding and movable laterally on the tubular shaft 13 is a selector 15, having a pin 16 that is disposed in the slot 14 of the tubular shaft 13 and in the circumferential groove 12 of the interior shaft 1. The selector 15 is characterized by a peripheral transverse notch 17, Fig. 4, and by a circumferential groove 18, the end walls 19 of which are disposed at opposite sides of the notch 17. When the handle 5 is employed to move the shaft 1 endwise, we associate with the said handle 5 on the steering wheel 3 a segmental index 20 having graduations to indicate when the selector 15 is positioned for neutral, reverse, low speed, intermediate speed, and high speed.

In the preferred embodiment of our invention the transmission is inclosed in a casing 21, and fastened on said casing 21 is a cover 22. The said cover 22 is equipped with a hood 23, and in the end walls of the said hood 23 are journaled the end walls of the tubular shaft 13 which is held against endwise movement by the ribs 24 best shown in Fig. 10 or by any other suitable means.

The transmission is of course of selective type and is shown as including two sets of shiftable gears 25 and 26. Associated with the sets of gears 25 and 26 are yokes 27 and 28, respectively. On the yoke 28 is a head 29, and on the yoke 27 is a head 30. The head 29 is provided with a bore 31 to receive a guide rod 32 movable rectilinearly in the casing 21, and the said head 29 is fixed to said rod 32 preferably through the medium of a pin 33. The head 30 is similarly bored at 34 to receive a rod 35 to which the head is pinned or otherwise fixed. We prefer to provide the rods 32 and 35 with indentations 36 for coöperation with spring-pressed detents 37 carried by the casing 21, this in order to preclude endwise movement of the rods and the parts fixed thereto except when the said parts are subjected to stress as hereinafter described. On the head 29 is provided a comparatively long tooth 40 for coöperation with the notch 17 in the selector 15 and it will also be noticed that the said head 29 is provided adjacent to opposite corners with pins 41 and 42 and comparatively large lugs 43 and 44, the lugs 43 and 44 being spaced from the pins 41 and 42, respectively, as shown. On the head 30 is provided a stepped tooth as best shown in Fig. 7 the high portion of said tooth being numbered 44ˣ and the low portion thereof being numbered 45. The head 30 is also provided adjacent to opposite corners with pins 46 and 47, and spaced from said pins 46 and 47 are lugs 48 and 49, respectively.

Fixed in approved manner on the tubular shaft 13 is a crank 50, and pivotally connected to and extending forwardly from the said crank 50 is a rod 51 the forward end of which is connected in such manner as to afford lost motion with the upper arm of a clutch collar 52 that is fixed at an intermediate point of its length and in the usual manner to the rock shaft 53 to which is also connected the usual clutch pedal 54, Fig. 1. The collar 52 is connected in the ordinary or any other approved manner with the usual clutch member 55, designed to be normally held in engagement with the complementary clutch member or fly wheel 56 through the medium of a spring 57 about the usual shaft 57ᵃ that extends rearwardly to the transmission.

In Figs. 3 and 4 our improvement is shown in neutral, and in Fig. 5 as in "high." With this understanding the operation of our improvement will be readily understood from the following:—

With the parts in neutral the driver first disengages the clutch and then moves the handle 5 to the low point of the index 20. Said movement has the effect of moving the selector 15 laterally to the end of the tooth 40 on head 29 that is adjacent to the tooth 44ˣ on the head 30. When this is done the selector 15 is positioned for the throwing the gears into low by operation of the connections 50, 21. It will also be understood that the said lateral movement of the selector 15 serves by the coöperation of the pin 16 with the serpentine groove 14 of the tubular shaft 13 to turn the said tubular shaft 13 and thereby move the connection of the arm 50 with the rod 51 above the dead center. From this it follows that on the release of the clutch, the rod 51 by pushing rearwardly on the arm 50 and rocking the tubular shaft 13 will turn the selector 15 and bring about movement of the head 29 and its yoke 28 to shift the gears for low speed. At this time, i. e., after the selector 15 is turned, it will be observed that by virtue of one of the pins on the head 29 being in the circumferential groove 18 of the selector 15, the selector cannot be moved laterally, and hence there is no liability of an accidental shifting of gears. The clutch, however, can be released to permit coasting of the car without interfering with the selection made through the medium of the selector 15 as described. It will also be noted that the pin of the head 29 assists the selector 15 in returning the head 29 and yoke 28 to a position in which the notch 17 in the selector 15 will again engage the tooth 40 to enable the selector by coöperation with the head 29 to return the gears to neutral position. The lugs 43 and 44 of the head 29, and the lugs 48 and 49 of the head 30 have for their functions to limit the turning movement of the selector 15 so that the said selector will always be in position for quick operation. The pins 46 and 47 are designed to serve the same purpose as the pins 41 and 42 of the head 29.

To reverse the operator first sets the hand control to advance the selector 15 lengthwise of the tubular shaft 13 without turning of the said shaft. Then on release of the clutch the gears are shifted into reverse position. When the selector 15 is moved on the tooth portion 44ˣ of the head 30, the release of the clutch throws the yoke 27 toward the rear and puts the gears in intermediate, and when the selector 15 is moved on the tooth portion 45 and the clutch is released the head 30 will be moved forwardly and the gears put in high. It will be understood in the foregoing connections that it is essential to move the selector 15 to neutral as a condition precedent to shifting the said selector 15 laterally. This will be better understood when it is again mentioned that on turning movement of the selector 15 one of the pins 41, 42, 46 or 47 will rest in the circumferential groove of the selector 15 to prevent lateral movement of the selector until the notch 17 thereof is coincident with the teeth of the heads and the circumferential groove of the selector is clear of all of the pins mentioned.

An important characteristic of our invention resides in the utilization of the interior shaft 1 and the tubular rock shaft 13 to bring about the lateral shifting and the turning, respectively, of the selector 15. It will also be appreciated that our improvement is a material simplification of anything extant designed for an analogous purpose, and that our improvement is not only free of delicate parts such as likely to get out of order after a short period of use but is not liable to be deranged by an intelligent manipulation.

The construction herein shown and described constitutes the best practical embodiment of our invention of which we are aware, and we have specifically described the construction and relative arrangement of the parts in order to impart a clear and exact understanding of the said embodiment. It is not to be understood, however, that we intend to limit ourselves to the said specific construction and relative arrangement of parts inasmuch as in the future practice of the invention various changes in the form and relation of parts may be made within the scope of our appended claims.

It will be observed by reference to Fig. 7 that the tooth 45 is of a less depth than the adjacent tooth 44$^x$. From this it follows that when the selector is in engagement with the tooth 45 the throw of the head 30 will be less than when the selector is in engagement with tooth 44$^x$; also, that the teeth may when necessary be varied in depth notwithstanding all are acted upon by the preferably beveled walls of the notch 17.

Having described our invention, what we claim and desire to secure by Letters-Patent, is:—

1. The combination in gear shifting means, of movable toothed heads equipped to move gears, a laterally-movable selector to coöperate with the teeth of said heads, a tubular shaft on which the selector is laterally shiftable and by which the selector is turned, and a shaft movable endwise in the tubular shaft and by which the selector is shifted laterally on the tubular shaft.

2. The combination in gear shifting means, of movable toothed heads equipped to move gears, a laterally-movable selector to coöperate with the teeth of said heads, a tubular shaft on which the selector is laterally shiftable and by which the selector is turned, and a shaft movable endwise in the tubular shaft and by which the selector is shifted laterally on the tubular shaft, with a clutch connected with and adapted to turn the tubular shaft.

3. The combination in gear shifting means, of movable toothed heads equipped to move gears, a laterally-movable selector to coöperate with the teeth of said heads, a tubular shaft on which the selector is laterally shiftable and by which the selector is turned, and a shaft movable endwise in the tubular shaft and by which the selector is shifted laterally on the tubular shaft, with manually-controlled means to move the endwise-movable shaft.

4. The combination in gear shifting means, of movable toothed heads equipped to move gears, a laterally-movable selector to coöperate with the teeth of said heads, a tubular shaft on which the selector is laterally shiftable and by which the selector is turned, and a shaft movable endwise in the tubular shaft and by which the selector is shifted laterally on the tubular shaft with a clutch connected with and adapted to turn the tubular shaft, and manually-controlled means to move the endwise-movable shaft.

5. The combination in gear shifting means, of movable toothed heads equipped to move gears, a laterally-movable selector to coöperate with the teeth of said heads, a tubular shaft on which the selector is laterally shiftable and by which the selector is turned, and a shaft movable endwise in the tubular shaft and by which the selector is shifted laterally on the tubular shaft, the tubular shaft being provided with a serpentine slot, and the selector being connected with the endwise-movable shaft by means movable in said slot.

6. The combination in gear shifting means, of movable toothed heads equipped to move gears, a laterally-movable selector to coöperate with the teeth of said heads, a tubular shaft on which the selector is laterally shiftable and by which the selector is turned, and a shaft movable endwise in the tubular shaft and by which the selector is shifted laterally on the tubular shaft; the selector being transversely notched to engage the teeth of the heads.

7. The combination in gear shifting means, of movable toothed heads equipped to move gears, a laterally-movable selector to coöperate with the teeth of said heads, a tubular shaft on which the selector is laterally shiftable and by which the selector is turned, and a shaft movable endwise in the tubular shaft and by which the selector is shifted laterally on the tubular shaft; the selector being transversely notched to engage the teeth of the heads and being also circumferentially grooved, and the heads being equipped with pins to enter said groove and prevent accidental lateral shifting of the selector.

8. The combination in gear shifting means, of movable toothed heads equipped to move gears, a laterally-movable selector to coöperate with the teeth of said heads, a tubular shaft on which the selector is laterally shiftable and by which the selector is turned, and a shaft movable endwise in the tubular shaft and by which the selector is shifted laterally on the tubular shaft; the selector being transversely notched to engage the teeth of the heads, and the heads being provided with lugs to limit the turning movement of the selector.

9. The combination in gear shifting means, of movable toothed heads equipped to move gears, a laterally-movable selector to coöperate with the teeth of said heads, a tubular shaft on which the selector is laterally shiftable and by which the selector is turned, and a shaft movable endwise in the tubular shaft and by which the selector is shifted laterally on the tubular shaft; the selector being transversely notched and circumferentially grooved, and the heads being provided with pins and lugs.

10. The combination in gear shifting means, of movable toothed heads equipped to move gears, a laterally-movable selector to coöperate with the teeth of said heads, a tubular shaft on which the selector is laterally shiftable and by which the selector is turned, and a shaft movable endwise in the tubular shaft and by which the selector is shifted laterally on the tubular shaft; the tubular shaft being provided with a crank, with a clutch collar, and a rod connection between said crank and collar.

11. The combination in gear shifting means, of movable toothed heads equipped to move gears, a laterally-movable selector to coöperate with the teeth of said heads, a tubular shaft on which the selector is laterally shiftable and by which the selector is turned, and a shaft movable endwise in the tubular shaft and by which the selector is shifted laterally on the tubular shaft, with a steering post, a handle supported thereby, an index complementary to said handle, and a connection intermediate of the handle and said endwise movable shaft to move the latter by the former.

12. The combination in gear shifting means, of side by side movable toothed heads equipped with transverse teeth and also equipped with gear-moving means, a laterally-shiftable and turnable selector to coöperate with said heads, means to shift said selector, and means to turn the same; the selector being transversely notched to engage the teeth, and the heads having lugs to limit the turning movement of the selector.

13. The combination in gear shifting means, of side by side movable toothed heads equipped with transverse teeth and also equipped with gear-moving means, a laterally-shiftable and turnable selector to coöperate with said heads, means to shift said selector, and means to turn the same; the heads being equipped with pins, and the selector having a circumferential groove to receive said pins.

14. The combination in gear shifting means, of side by side movable toothed heads equipped with transverse teeth and also equipped with gear-moving means, a laterally-shiftable and turnable selector to coöperate with said heads, means to shift said selector, and means to turn the same; the heads having pins and lugs, and the selector being limited in its turning movements by the lugs and being circumferentially grooved to receive the pins.

In testimony whereof we affix our signatures.

FRANK J. HOFMEISTER.
JAMES O. MIDDAUGH.